Aug. 14, 1928.
N. S. DUNAWAY
1,680,734
DUMPING TRUCK
Filed Jan. 26, 1926
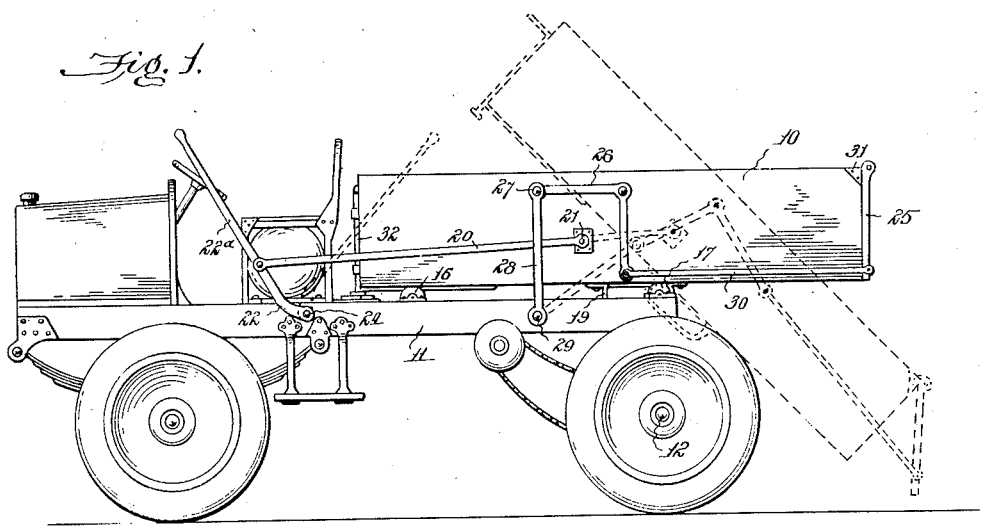
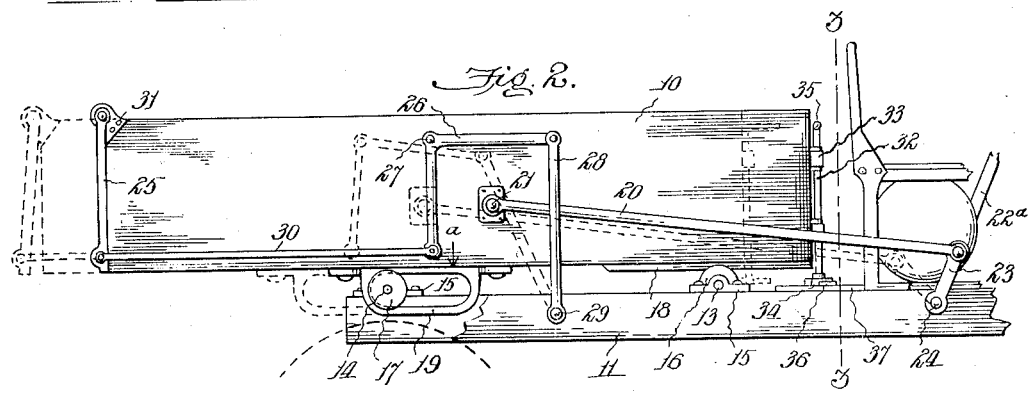
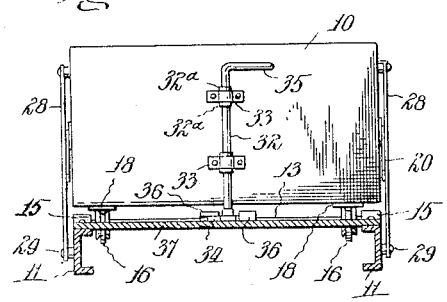
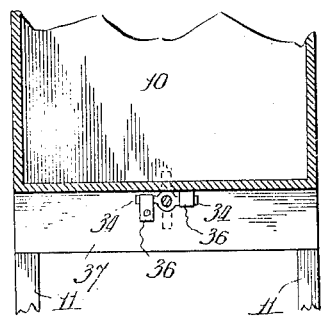
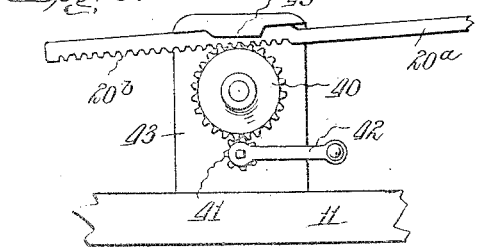
Norman S. Dunaway.
INVENTOR.
BY John B Thomas Co.
ATTORNEYS.

Patented Aug. 14, 1928.

1,680,734

UNITED STATES PATENT OFFICE.

NORMAN S. DUNAWAY, OF HOUSTON, TEXAS.

DUMPING TRUCK.

Application filed January 26, 1926. Serial No. 83,884.

My invention is an improvement in trucks of that particular type in which the load is dumped by a rearward and tilting movement of the body on the chassis or running-gear, and the principal object I have in view is to provide for suspending the body in dumping position over the rear axle to properly balance the load on the chassis during this operation, with a limited forward movement on the chassis or running-gear to carrying position; together with simple and effective means for sliding and tilting the body by manual operation, and means for locking the body on the chassis in its forward or carrying position.

A further object of my invention is to provide an arrangement of levers and connecting rods between the chassis, body and tailgate for opening and closing the latter automatically by the sliding and tilting movement of the body, the particular arrangement of the levers providing for a limited tilting movement of the body.

With these principal objects in view my invention consists in the particular construction and arrangement of parts cooperating to produce the improved dumping truck hereinafter fully described, and what I claim as new and desire to protect by Letters Patent is specifically set forth in the appended claim.

In the accompany drawings:

Fig. 1 is a side elevation illustrating a motor truck or dumping truck constructed in accordance with my invention.

Fig. 2 is a similar view, enlarged, of the body and cooperating parts of the chassis.

Fig. 3 is a similar view on the line 3—3 of Fig. 2, to show the body locking means.

Fig. 4 is a detail plan view of the locking means, and

Fig. 5 is a detail view of a modification of the body operating means.

In carrying out my invention the dumping body 10 is mounted on a conventional type of chassis for trucks, such as illustrated in Fig. 1, having longitudinal supporting beams 11 11 which in the present instance terminate at their rear ends only a slight distance in the rear of the vertical plane of the rear axle 12, for the purpose hereinafter explained. The chassis is provided with two transverse shafts 13 14 journalled at their ends in bearing boxes 15 bolted on the beams 11 and each carrying a pair of grooved rollers for supporting the body slidably on the chassis or running gear the rollers 16 receiving the front end of said body and the rollers 17 the rear end thereof. The rollers 17 are at the rear ends of the supporting beams and on a vertical plane with the rear axle and as the body has a tilting movement on these rollers the weight of the load during the tilting operation will be directly over the rear axle and consequently supported by the rear wheels to relieve the chassis of undue strain. Furthermore, by reference to Fig. 2 it will be noted that the body being connected to the rollers 17 in the usual manner by yokes 19, with the forward ends of the latter on a line with the center $a$ of said body to position the center over said rollers in dumping position and thereby facilitate the operation of dumping the load so that it may be accomplished with a minimum expenditure of power and therefore manually by the mechanism hereinafter described. The length of the yokes 19 is such as to provide for only a limited forward horizontal movement of the body on the rollers 17 and 16, the latter receiving the rails or wear-plates 18 secured to the underside of the body at the forward end thereof.

To slide the body rearward on the rollers and tilt the same on the rollers 17 rods 20, 20 are connected at their rear ends by pintles 21 to the sides of said body a short distance in the rear of the center thereof and extending forwardly are connected to arms 22 and 23 secured to the ends of a transverse shaft 24 supported by the beams 11 11, said shaft being preferably located beneath the driver's seat and the arm 22 extended upwardly to provide an operating lever $22^a$ within easy reach of the driver. When the lever is thrown a certain distance rearward the body will be slid to the position shown in dotted lines Fig. 2, and a further throw of the lever will tilt the rear end of the body downward, as shown in dotted lines Fig. 1, the body being then suspended by the yokes 19 over the rear ends of the chassis in dumping position. To return the body to carrying position the lever is thrown forward to tilt the body back to horizontal position and then slide it forward to carrying position where it is locked by means of a vertical shaft 32 bearing in keepers 33 at the forward end of the body and having oppositely-projecting arms 34, 34 at its lower end adapted to engage shouldered lugs 36 secured on a cross-piece 37 between the beams 11 11; it being noted by reference to Fig. 4 that when the arms 34 are on a line with the longitudinal center of the truck they will permit the body to be operated and when turned by operation of the shaft by handle 35 to engage the lugs under the shoulders thereof the body will be locked against sliding movement and also against a tilting movement if overloaded at the rear end thereof. The locking shaft 32 is held against sliding movement in the keepers or bearings 33 by collars 32ᵃ on the shaft bearing at opposite sides of the bearings.

To automatically open and close the tail-gate 25 means are provided at opposite sides of the body of the truck, and as they are alike a description of one set of tail-gate operating means will apply to both; said means consisting of a bell-crank lever 26 pivoted to the side of the body at 27 with its forwardly projecting member connected by link 28 to the side beam 11 below and its downwardly projecting member connected by rod 30 to the lower end of the gate which is hinged at its upper end to the fixtures 31. In the normal or carrying position of the body the position of the bell-crank lever is as shown in full lines Fig. 2, that is with its forwardly projecting member horizontal and its downwardly projecting member vertical, and the position of the link 28 is vertical with its lower end connected by pivot-pin 29 to beam 11. As the body slides rearward the bell-crank lever will be rocked by means of the connecting-link 28 and slightly open the gate, and as the body is tilted downward in dumping the gate will be opened sufficiently to deposit the load, in the latter position the link 28 and companion member of the bell-crank lever being on a line to limit the tilting movement of the body.

Instead of operating the rods 20 by arms and a lever, as hereinbefore described they may be operated by gear-wheels 40 and pinion 41, the latter having a crank-handle 42, as shown in the modification Fig. 5, in which instance the forward ends of the rods would be provided with rack-teeth 20ᵇ and held in engagement with the gearwheels by the overhanging lip 43ᵃ formed on the supporting plate 43 attached to the longitudinal supporting beam 11, the shaft of the gearwheels 40 extending from one side of the truck to the other, as will be understood. This arrangement could be used for heavy trucks, or the movement of the body for sliding and tilting the same, accomplished in any other manner, as for instance by chain and ratchet.

A truck constructed in accordance with my invention provides a very simple and effective means for not only dumping the body in a manner to relieve strain on the chassis or running gear by disposing the weight of the body on a vertical plane with the rear axle or axis of the rear wheels but also provides for opening and closing the tail-gate automatically, as well as limiting the dumping position of the body.

I claim:—

In a dumping truck, the combination with a rearwardly moving tilting body and a tail-gate pivoted at the upper end of the body to have an outward swinging movement at its lower end, of tail-gate operating means comprising bell-crank levers pivoted on the sides of the body at the upper ends thereof and each having a forwardly projecting horizontal member and a vertically projecting vertical member, rods connecting the lower ends of the vertical members of the bell-crank levers to the lower end of the tail-gate, and vertical links pivotally connected to the forward ends of the horizontal members of said bell-crank levers and to the chassis, whereby when the body is moved rearward on the chassis and tilted the bell-crank levers and links connecting the same to said chassis will limit the tilting movement.

NORMAN S. DUNAWAY.